June 7, 1966  G. H. COOPER  3,254,829
SEALING OF THERMOPLASTIC CONTAINERS
Filed June 30, 1964
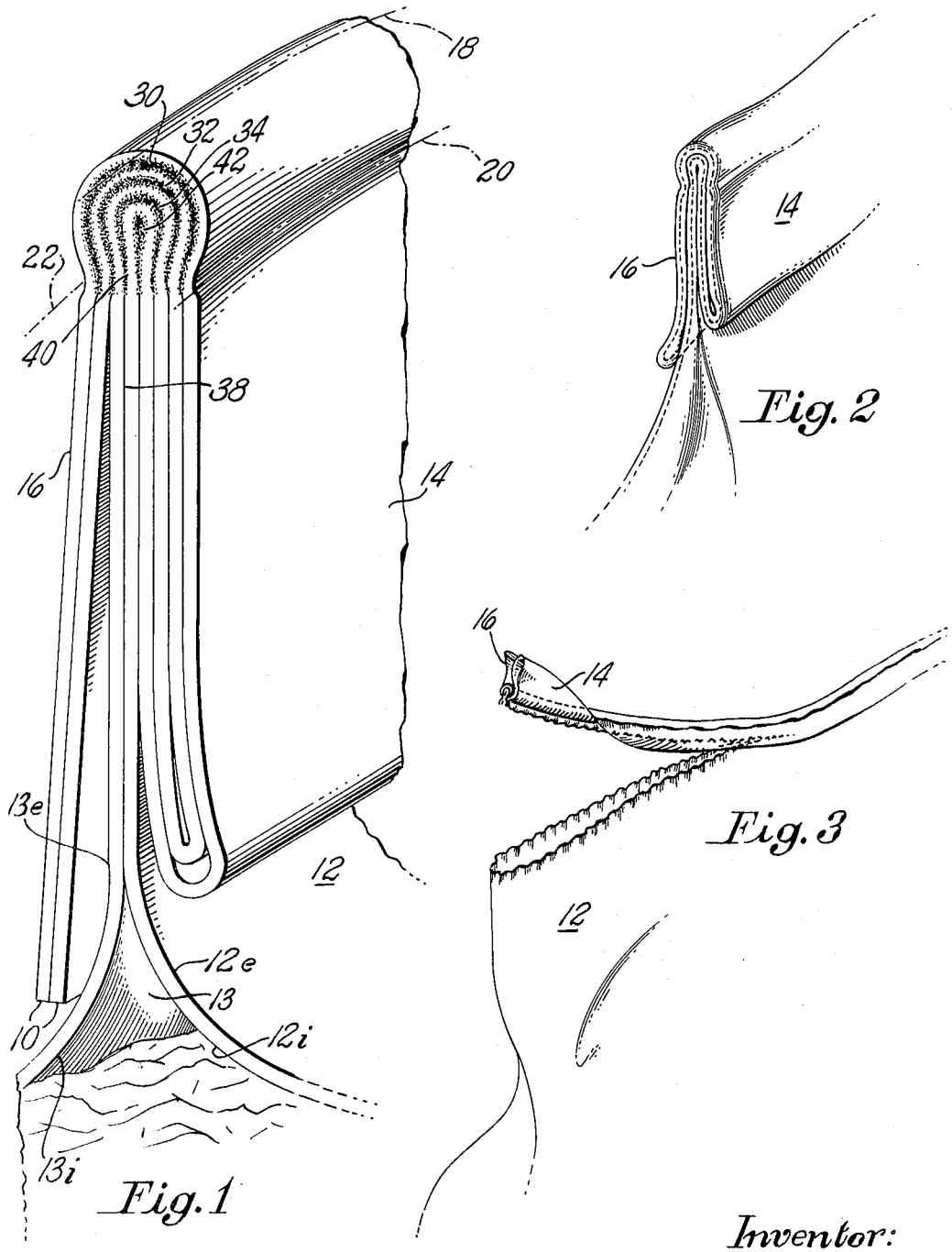
Inventor:
George H. Cooper
By his Attorney
Richard B. Negley

3,254,829
SEALING OF THERMOPLASTIC CONTAINERS
George H. Cooper, Byfield, Mass., assignor to United Shoe Machinery Corporation, Flemington, N.J., a corporation of New Jersey
Filed June 30, 1964, Ser. No. 379,328
6 Claims. (Cl. 229—62)

This invention relates generally to sealing flexible plastic containers and more specifically both to a novel seam for bags made of thermoplastic materials such as the polyolefins and to a method of forming the seam. The advent of plastics, particularly the polyolefins, for use in containers or bags has presented a number of problems not found in the use of older types of packaging materials, particularly paper. One specific problem which has disturbed the plastic packaging industry has been the inability to form seams (particularly bag closing seams) in thermoplastic materials such as polyethylene which are strong enough to resist rupture but which can be easily opened by hand. Heretofore, the seams employed for closing polyolefin bags has normally been so strong that it was easier to cut the bag than to tear or break the seam itself. However, inaccurate cutting often destroyed the entire bag requiring all of the contents to be removed at one time. This was particularly disadvantageous when the user only wanted a small part of the contents and wished to store or save the remainder. Consequently, numerous attempts were made to provide a seam in thermoplastic bags which could be easily opened without destroying the remainder of the bag. However, until the subject invention no solution was forthcoming which provided a bag closing seam of strength comparable to or exceeding that of the remainder of the bag and which also was easily opened by hand.

A more specific problem solved by the subject invention is the sealing of thermoplastic containers or bags for pulverulent materials such as flour, powdered chemicals and the like. Earlier closing seams were not capable of securely sealing a package made of thermoplastic, such as a polyolefin, after they had been filled with dusty or finely granulated material. The presence of dust or powder on the surfaces of the layers to be sealed effectively prevented their being fused into a satisfactory seam. The failure of prior attempts to solve this problem has prevented the use of thermoplastic bags as an economic and efficient means for packaging pulverulent materials. To circumvent the problem, the packaging industry has developed an assortment of costly and cumbersome machines to remove the dust or granules from an area along which a seam may be formed after the bag has been filled. However, in addition to the cost, these machines are undependable in operation.

Accordingly, it is an object of this invention to provide in a flexible container or bag of thermoplastic material, particularly a polyolefin, a closing seam which can readily be opened by hand.

Another and more specific object of this invention is to provide in a container or bag of thermoplastic material, particularly a polyolefin, for packaging pulverulent materials a closing seam which has a strength equal to or exceeding that of the container body.

Still another object of this invention is to provide in a flexible container or bag of thermoplastic material, particularly a polyolefin, for packaging pulverulent materials a closing seam which can both readily be opened by hand which has a strength equal to or exceeding that of the container body.

Another object is to provide a method of forming a closing seam which will accomplish the above objects.

To these ends and in accordance with a feature of this invention there is provided in a thermoplastic container a closing seam comprising a laminated essentially bulbous cyst formed of a plurality of layers of themroplastic material, said cyst circumscribing the longitudinal extent of the walls of the container, said cyst in transverse section comprising a plurality of fused areas formed at the interfaces of said layers, and flaps depending from said cyst for severing said cyst from the main body of the container. There is also provided a method of sealing thermoplastic containers comprising circumscribing the longitudinal extent of the walls of the container with thermoplastic material, mounting said circumscribed wall portion between elongated members with the apex area thereof extending above said elongated members, and applying heat to the longitudinal extent of said apex area along a line generally parallel to the apex thereof.

The above and other features of the invention will now be more particularly described with reference to the accompanying drawings and pointed out in the claims. The principles and features of this invention may be employed in various and numerous embodiments without departing from the scope of this invention.

In the drawings,

FIG. 1 is an angular view in section on an enlarged scale of a thermoplastic container embodying the closing seam of the subject invention, the section indicia having been omitted for clarity;

FIG. 2 is a perspective view on a smaller scale of a portion of the normally open end of a thermoplastic bag embodying the closing seam of the subject invention; and FIG. 3 is a perspective view on a further reduced scale illustrating the easy open connection of the closing seam of the subject invention.

The particular closing seam illustrated in the drawings and hereinafter to be described shows merely one particular embodiment of the invention, i.e. a single type of bag, to which the subject invention can be applied. It is to be understood that the closing seam and the method of forming it are equally applicable to any thermoplastic container or bag or to a structure not necessarily a container as long as there are a plurality of layers that can be assembled to permit the formation of a plurality of fused areas extending arcuately over and around the terminal portion of the walls, e.g. the open end of a bag. The use of separate material, i.e. other than that constituting an integral part of a bag, container or structure, to form a plurality of interfaces or fused areas is considered to be within the scope of the invention.

The fold shown in the drawings is most easily formed by first aligning with each other the edges 10 which define the open end of a thermoplastic bag before any seam is formed. A first flap is made in the bag by folding the aligned edges 10 over some imaginary line running lengthwise of the open end of the bag generally paralleling the edges 10. This first fold or flap is intentionally made relatively wide to afford sufficient material to make a second fold, this time in the opposite direction. The resultant folded end of the bag is best seen in FIG. 1 and comprises in addition to the originally aligned ends 10, bag walls 12 and 13, and depending flaps 14 and 16 both of which are long enough to be grasped between the thumb and forefingers. The flap 14 will be seen to comprise four layers of material and the flap 16 two layers.

The fold is then sealed to complete the closing seam by applying heat to the folded portion in a direction extending downwardly from a line 18 (FIG. 1) designating generally the longitudinal crest or apex of the fold. During the application of heat a restrictive force is applied to the flaps 14 and 16 by the application by rods (not shown) placed in engagement with the flaps 14 and 16 along lines 20 and 22 extending generally parallel to the crest or apex line 18. If desired, a pair of plates may be employed to cover that portion of the flaps 14 and 16 below the lines 20 and 22, respectively as seen in FIG. 1. The application of heat to the folded portion extending above the lines 20 and 22 produces a plurality of fused areas 30, 32 and 34 at the interfaces of the folded layers of bag material. These areas are arcuate in shape (i.e. when seen in section as in FIG. 1), and circumscribe the walls 12 and 13 of the bag.

The interior surfaces of the bag walls 12 and 13 form an interface 38 which extends upwardly of the flaps 14 and 16 to an area 40 which may be said to constitute the inner-most fused portion of the closing seam of this invention. As will be seen in the lower portion of FIG. 1, the inner surfaces 12$i$ and 13$i$ of the bag walls 12 and 13, are the "dirty surfaces" whereas the exterior surfaces 12$e$ and 13$e$ are the "clean surfaces" being on the outside of the bag and not in contact with the powdered or dusty material. Thus, the areas 40 and 34 are formed between the "dirty surfaces." In like fashion, the fused area 30 is between "dirty surfaces." However, the entire arcuate extent of the fused area 32 is between completely "clean surfaces" 12$e$ and 13$e$ as is the innermost fused area 42, both faces of which comprise the clean surface 12$e$. Thus, there are a total of two fusions formed on completely clean surfaces and two on dirty surfaces. The closing seam thus provides a solution to the sealing of thermoplastic containers used to package puverulent materials.

The resultant closing seam as shown, particularly in FIG. 1, will be seen to comprise a bulbous cyst extending lengthwise of the walls of the bag and comprising a plurality of fused areas which are substantially inverted U-shaped, the fused areas terminating at the throat of the cyst established by the location of the rods placed along the lines 20, 22.

The plurality of fused arcuate or inverted U-shaped areas not only provide a plurality of seals between the respective "clean and dirty surfaces" but also cooperatively serve as a clamping member. The greatest effective force tending to open the seam are the interior forces applied by the contents of the bag which tend to peel apart the surfaces 12$i$ and 13$i$, particularly at the area of the fused interface 40. The fact that joined laminated layers are weaker in their resistance to peeling than they are to shear or tension is well known. However, the cumulative clamping forces afforded by the arcuate areas 30 and 32 as well as the rigidity afforded by the fused area 42 effectively forms a resistance to the surfaces 12$i$ and 13$i$ being peeled apart.

In addition to the beneficial effects resulting from the presences of the "clean surfaces," the plurality of layers of material provided by the folded closure counteract the problem presented by the dusty or granular material. The reason for this is that the superposed layers permit the laminated cyst to "work" when heat is applied to it and thereby to fuse foreign matter such as dust and granules within the fused areas 34 and 40.

As illustrated in FIG. 3, the seams shown in FIGS. 1 and 2 can readily be opened by the simultaneous application of upward force on the depending flaps 14 and 16.

The upward movement of the flaps 14, 16 applies forces on the bag walls 12 and 13 where the thickness of the original material has been reduced in the fusion process. The combination of this thickness reduction and the use of the flaps 14, 16 facilitates the easy opening of the container 12. The opening of the container in this manner permits its subsequent re-use.

The method of the subject invention is practiced by circumscribing the walls 12 and 13 of a thermoplastic container with thermoplastic material, confining said circumscribed portion against expansion with the apex area of the circumscribed portion extending above the confining means and applying heat to the longitudinal extent of said apex area.

Having thus described my invention what I claim as new and desire to secure by Letters Patent of the United States is:

1. A closing seam for thermoplastic containers comprising a laminated essentially bulbous cyst formed of a plurality of layers of thermoplastic material in essentially coalesced relationship, said cyst circumscribing the longitudinal extent of the walls of the container, said cyst in transverse section comprising a plurality of fused areas formed at the interfaces of said layers.

2. A closing seam for thermoplastic containers comprising a laminated essentially bulbous cyst formed of a plurality of layers of thermoplastic material in essentially coalesced relationship, said cyst circumscribing the longitudinal extent of th ewalls of the container, said cyst in transverse section comprising a plurality of generally arcuate fused areas formed at the interfaces of said layers, a plurality of said fused areas circumscribing the walls of said container and terminating at the throat of said cyst.

3. A closing seam for thermoplastic containers comprising a laminated essentially bulbous cyst formed of a plurality of layers of thermoplastic material in essentially coalesced relationship, said cyst circumscribing the longitudinal extent of the walls of the container, said cyst in transverse section comprising a plurality of generally arcuate fused areas formed at the interfaces of said layers, a plurality of said fused areas circumscribing the walls of said container and terminating at the throat of said cyst, and flaps compriscing portions of said layers which extend from said cyst below the throat whereby said cyst may be severed from the main body of said container.

4. A closing seam for thermoplastic containers comlongitudinal extent of the walls of the container formed of a plurality of layers of thermoplastic material in essentially coalesced relationship, said cyst having in transverse section a fused area circumscribing the terminal portion of the container, and flaps integral with and depending from said cyst for severing said cyst from the main body of the contanier, said flaps being disposed on opposite sides of the adjacent walls of the container whereby upward movement thereof effectuates opening of the container.

5. A closing seam for thermoplastic containers comprising a laminated essentially bulbous cyst formed of a plurality of layers of thermoplastic material in essentially coalesced relationship, said cyst circumscribing the longitudinal extent of the walls of the container, a plurality of fused areas located at the interfaces formed by said layers and said walls, and flaps integral with and depending from said layers for removing the closure seam from said container and for severing the walls of the container at the fused area formed in the interface thereof.

6. A closure seam for thermoplastic containers comprising an essentially bulbous cyst formed of a plurality of layers of thermoplastic material in essentially coalesced relationship, said cyst circumscribing the longitudinal extent of the terminal portion of the walls of the container, a plurality of superposed fused areas interposed between said layers and the abutting layers of the walls, said fused areas terminating at the throat of said cyst, and flaps comprising portions of said layers which extend from said cyst below the throat for removing the closure seam from said container and for severing the walls of the container at the fused area formed therebetween.

References Cited by the Examiner

UNITED STATES PATENTS 2,429,505 10/1947 Ashman.
2,973,087 2/1961 Rohdin _____ 229—51

FOREIGN PATENTS 1,028,489 4/1958 Germany.
943,457 12/1963 Great Britain.

JOSEPH R. LECLAIR, *Primary Examiner.*

FRANKLIN T. GARRETT, *Examiner.*

D. M. BOCKENEK, *Assistant Examiner.*

UNITED STATES PATENT OFFICE
CERTIFICATE OF CORRECTION

Patent No. 3,254,829  June 7, 1966

George H. Cooper

It is hereby certified that error appears in the above numbered patent requiring correction and that the said Letters Patent should read as corrected below.

Column 1, line 22, for "has" read -- have --; line 44, after "satisfactory" insert -- closing --; column 2, line 10, for "themroplastic" read -- thermoplastic --; line 28, for "various" read -- varied --; column 4, line 29, for "th ewalls" read -- the walls --; line 43, for "compriscing" read -- comprising --; line 48, before "longitudinal" insert -- prising an essentially bulbous cyst circumscribing the --.

Signed and sealed this 10th day of September 1968.

(SEAL)
Attest:

Edward M. Fletcher, Jr.

Attesting Officer

EDWARD J. BRENNER

Commissioner of Patents